United States Patent [19]

Poindexter

[11] 4,080,254
[45] Mar. 21, 1978

[54] PLUG-TO-PLUG GAS TRANSFER SYSTEM

[75] Inventor: Allan M. Poindexter, Pleasant Hills, Pa.

[73] Assignee: The United States of America as represented by the United States Department of Energy, Washington, D.C.

[21] Appl. No.: 680,826

[22] Filed: Apr. 28, 1976

[51] Int. Cl.² .............................................. G21C 15/02
[52] U.S. Cl. .......................................... 176/87; 176/38
[58] Field of Search ............................ 176/37, 38, 87

[56] References Cited

U.S. PATENT DOCUMENTS

| 3,533,530 | 10/1970 | Gallo et al. | 176/87 |
| 3,819,478 | 6/1974 | Thorel et al. | 176/87 |
| 3,819,479 | 6/1974 | Jacquelin | 176/87 |

Primary Examiner—Peter A. Nelson
Attorney, Agent, or Firm—L. A. DePaul; Z. L. Dermer

[57] ABSTRACT

A system for conducting a fluid from one component to another component of a nuclear reactor wherein at least one such component is a rotatable closure head plug capable of movement relative to the other component. The conducting system utilizes the annulus located between the components as a connecting passageway for the fluid.

3 Claims, 5 Drawing Figures

PLUG-TO-PLUG GAS TRANSFER SYSTEM

GOVERNMENT CONTRACT

The invention described herein was made in the course of, or under, a contract with the U.S. Energy Research and Development Administration.

BACKGROUND OF THE INVENTION

This invention relates to a fluid conducting system and more particularly to a system for conducting fluid, without mechanical connections, between components of a nuclear reactor that are capable of movement relative to each other.

In nuclear reactors, there has been a problem with conducting fluids across the interface between rotatable components. The problem consists of providing a linkage from one rotatable component to another so that a fluid may be passed across the interface of the rotatable components without the linkage interfering with the movement of the components. Although this problem arises in many different reactor applications, it has been particularly troublesome where rotatable plugs are used on the head of a reactor vessel for the purpose of refueling the reactor and sealing the reactor internals in the reactor vessel.

In nuclear reactor designs, well known in the art, a reactor vessel with fuel assemblies disposed therein, and having an inlet and outlet for circulation of a coolant in heat transfer relationship with the fuel assemblies, is sealed by a head located on top of the reactor vessel. In certain designs, the head comprises one or more rotatable plugs. These plugs, which may be of varying sizes disposed eccentrically within each other, serve at least two purposes. One purpose is, of course, to seal the reactor internals inside the reactor vessel. Another purpose is to support refueling machines. The rotation of the rotatable plugs positions the refueling machines in appropriate relationship to the fuel assemblies in the reactor vessel to facilitate the refueling process. Since the rotatable plugs must be able to rotate relative to each other, the plugs are mounted so as to define an annulus between them. This annulus, while allowing the rotation of the plugs, also provides a path for the release of radioactive particles located in the reactor vessel. Accordingly, seals are provided at various locations across the annulus to prevent this release of radioactive particles. Although these designs are effective designs from a refueling standpoint, they create a problem where it becomes necessary to conduct a fluid across the annular interface of the plugs.

It is well known to those skilled in the art, that there are at least two purposes for conducting a fluid across these annular interfaces. One such reason is that some of the seals located across the annular interfaces may need to be inflated or buffered with a gas such as argon. In addition, it may become necessary to purge the annuli with a purge gas such as argon to reduce the concentration of radioactive particles therein. In either of these applications, it is necessary to conduct a gas from a stationary supply to a series of rotatable plugs which necessitates conducting the gas across the annular interfaces. A number of methods have been devised for accomplishing this conducting of gas, but they have all involved mechanical connections between the plugs which complicates the apparatus used to rotate the plugs.

An example of the mechanical connections used to conduct a gas across the annular interfaces and still allow rotation of the plugs is the use of swivel joints on standard tubing or piping. Another method is to hang flexible tubing from a tubing handling device located above the reactor vessel head. However, both of these methods like the others known in the art greatly increase the complexity of the reactor vessel head area by adding additional equipment that hampers plug rotation and obstructs access to the head itself.

A typical example of the design of nuclear reactors which utilize rotatable plugs as part of the reactor vessel head and which may incorporate a gas purge of the annulus in the absence of an inner head seal is described in U.S. Pat. No. 3,522,144 — J. Webb et al, issued July 28, 1970. The Webb patent illustrates the use of two liquid dip seals as the means for sealing the annulus to prevent release of radioactive particles. In this design, one of the liquid dip seals is located in the annulus near the top of the head while the other is located in the annulus near the bottom of the head. Under certain circumstances, radioactive particles present in a gas which covers the reactor coolant may bubble through the inner dip seal thus contaminating the annulus between the two dip seals. To minimize this contamination and to minimize the leakages of these particles through the outer dip seal, a gas such as argon or nitrogen may be introduced into the annulus between these dip seals building a pressure therein. The gas, under pressure, will bubble through the inner dip seal into the cover gas area of the reactor vessel thus reversing the leakage path and minimizing the escape of radioactive particles. Likewise, in the absence of the inner seal, the gas may be used to simply purge the annulus. While the Webb patent describes the use of a purge gas it does not teach a method of conducting the gas to several annuli in series. Therefore, the Webb Patent does not solve the problem of conducting a gas, without the use of mechanical connections, between the two components capable of relative movement.

In U.S. Pat. No. 3,819,479 — R. Jacquelin, issued June 25, 1974, there is described an apparatus for conducting a gas to seals and annuli between two components capable of relative movement. The Jacquelin patent describes the use of ducts for piping the gas to the annulus, but it does not teach a method for conducting the gas across the annulus.

SUMMARY OF THE INVENTION

A system for conducting a fluid from one component to another component of a nuclear reactor wherein at least one such component is capable of movement relative to the other component. The two components are arranged so that an annulus is defined between them. A fluid conducting medium is associated with each component. The fluid conducting medium of the first component conducts the fluid to the annulus while the conducting medium of the second component conducts the fluid away from the annulus. The annulus not only allows the components to move relative to each other, but it also acts as a connecting linkage between the components without hindering the members' relative movement. The system may employ several such annuli arranged in series.

It is an object of this invention to provide a system for conducting a fluid between rotatable components without the use of a mechanical connection.

It is a further object of this invention to provide a system for conducting a fluid between rotatable components wherein the annulus between the components is utilized as a passageway between the components.

It is a more particular object of this invention to provide a system for conducting a gas, without the use of tubing, between the two components of a nuclear reactor capable of relative movement.

BRIEF DESCRIPTION OF THE DRAWINGS

While the specification concludes with claims specifically pointing out and distinctly claiming the subject matter of the invention, it is believed the invention will be better understood from the following description taken in conjunction with the accompanying drawings, wherein:

DESCRIPTION OF THE PREFERRED EMBODIMENT

A nuclear reactor consists of a core containing fuel assemblies that produces heat. The core is contained within a reactor vessel having an inlet and outlet that permits the circulation of a coolant, such as liquid sodium, in a heat transfer relationship with the fuel assemblies of the core. The reactor vessel is closed at its top end by a closure head. In some designs this head comprises several rotatable plugs capable of independent rotation that support refueling apparatus. The rotation of these plugs position the refueling apparatus in appropriate relationship with the core in order to refuel the reactor. These rotatable plugs may be of varying sizes disposed eccentrically with respect to each other. They may be supported so as to define an annulus between them thereby enabling their relative rotation. This annulus must be sealed to prevent a contaminated cover gas which fills the space between the top of the reactor coolant level and the plugs, from escaping from the reactor vessel. The invention, herein described, provides a system for conducting a fluid across the annular interfaces of the plugs without using mechanical connections and without hindering the movement of the plugs.

Figure 1:
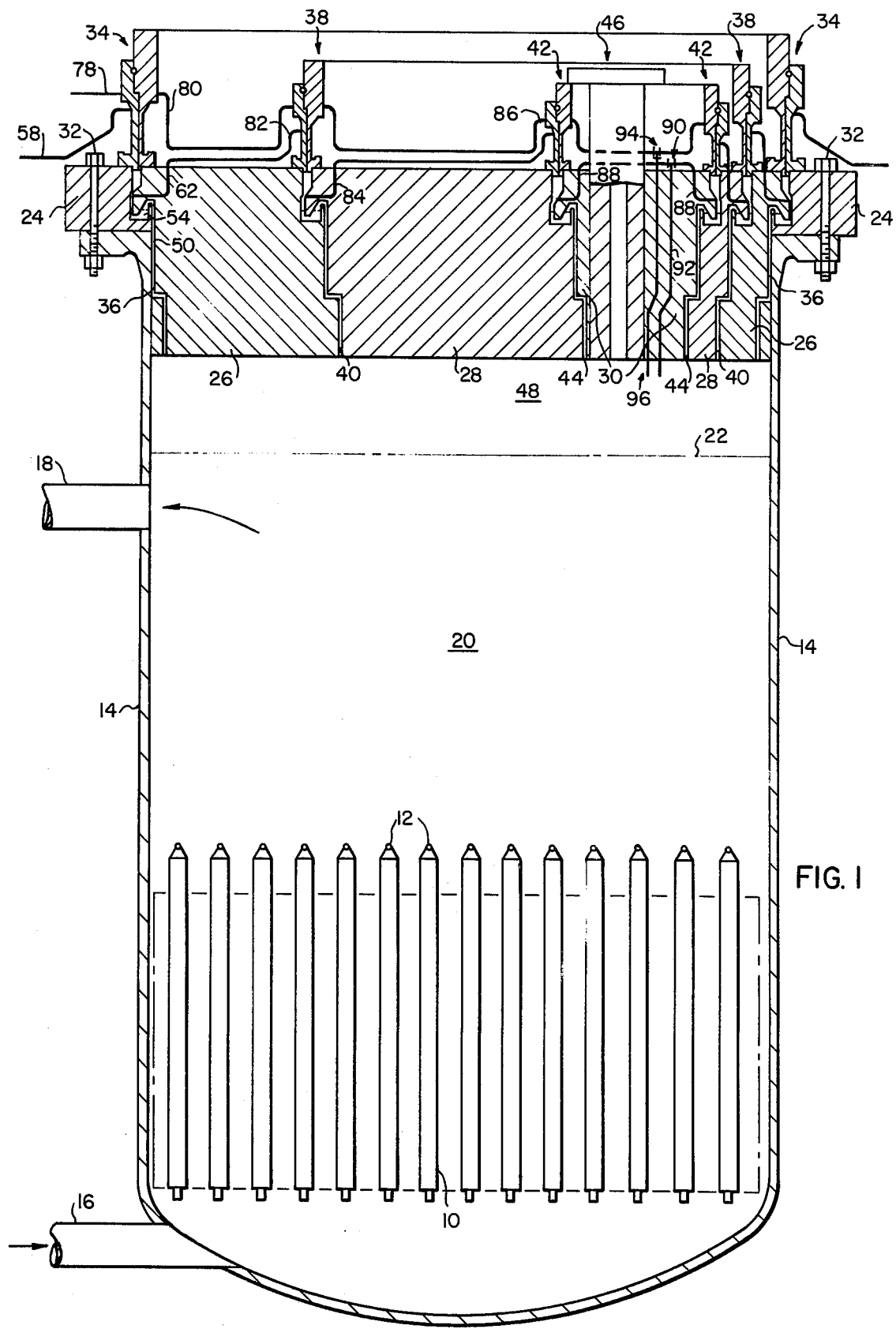
FIG. 1 is a cross-sectional view in elevation of a nuclear reactor having rotatable head plugs.

Referring now to FIG. 1, a core 10 comprising fuel assemblies 12 that produce heat is contained within a reactor vessel 14. The reactor vessel 14 has an inlet 16, and an outlet 18 that permits a coolant 20 to circulate in a heat transfer relationship with the fuel assemblies 12. The coolant 20, which in a fast breeder reactor may be liquid sodium, fills the reactor vessel 14 to a coolant level 22. The reactor vessel 14 is closed at its top end by a closure head, FIGS. 1 and 5, comprising a stationary outer ring 24, a large rotatable plug 26, an intermediate rotatable plug 28, and a small rotatable plug 30. The stationary outer ring 24 may be attached to the reactor vessel by bolts 32 or other suitable means known in the art. The large rotatable plug 26 is supported from the stationary outer ring 24 by large riser assembly 34. The outer peripheral surface of large rotatable plug 26 together with the inner peripheral surface of stationary outer ring 24 define an annulus 36 therebetween. The large riser assembly 34 which contains bearings, seals, and a plug drive mechanism (not shown) enables the large rotatable plug 26 to move relative to stationary outer ring 24 while maintaining a fluid tight boundary between the outside and inside of reactor vessel 14. In addition, the large riser assembly 34 locates the bearings, seals, and drive mechanism away from the hot surface of the large rotatable plug 26 thus providing a cooler operating environment and thus allowing a greater range of selectivity of bearings, seals, and drive mechanism materials.

Again referring to FIG. 1, intermediate rotatable plug 28 is disposed eccentrically within large rotatable plug 26 and supported by intermediate riser assembly 38 defining an annulus 40 therebetween in a manner similar to that of the large riser assembly 34. Likewise, the small rotatable plug 30 is similarly eccentrically disposed within intermediate rotatable plug 28 and supported by small riser assembly 42 defining an annulus 44 therebetween. In addition, small rotatable plug 30 has disposed therein an invessel transfer collar 46 which provides access for an invessel transfer machine (not shown). During refueling, an in-vessel transfer machine which may be chosen from those well-known in the art is placed in the bore of the in-vessel transfer collar 46. When the in-vessel transfer machine is in place in the in-vessel transfer collar 46, a selected combination of rotations of the three rotatable plugs 26, 28, 30 will align the in-vessel transfer machine in appropriate relationship with a chosen fuel assembly 12 of the core 10. As is well known in the art, the in-vessel transfer machine may then remove the chosen fuel assembly from the core and replace it with a fresh fuel assembly.

When the reactor coolant 20 is liquid sodium as in the case of liquid metal fast breeder reactors, it is necessary to avoid contact of the liquid sodium with oxygen because this interaction will result in a violent reaction. To thus avoid this interaction, the space between the bottom of the closure head and the coolant level 22 is filled with a cover gas 48 such as argon. The cover gas 48 not only fills the cover gas space between the bottom of the closure head and the top of the coolant level 22, but it also fills the annuli 36, 40, 44. While the cover gas 48 prevents oxygen from contacting the coolant 20, the cover gas 48, itself, is subjected to radiation exposure from the core and thus becomes contaminated with radioactive particles. It is therefore necessary to have the cover gas 48 circulated between the reactor and a cleaning process to remove most of the radioactive particles in a manner well known in the art. As indicated above, it is necessary to prevent this cover gas 48 from escaping up the annuli 36, 40, 44, through the seals in the closure head, and out of the reactor vessel.

Figures 2, 3:
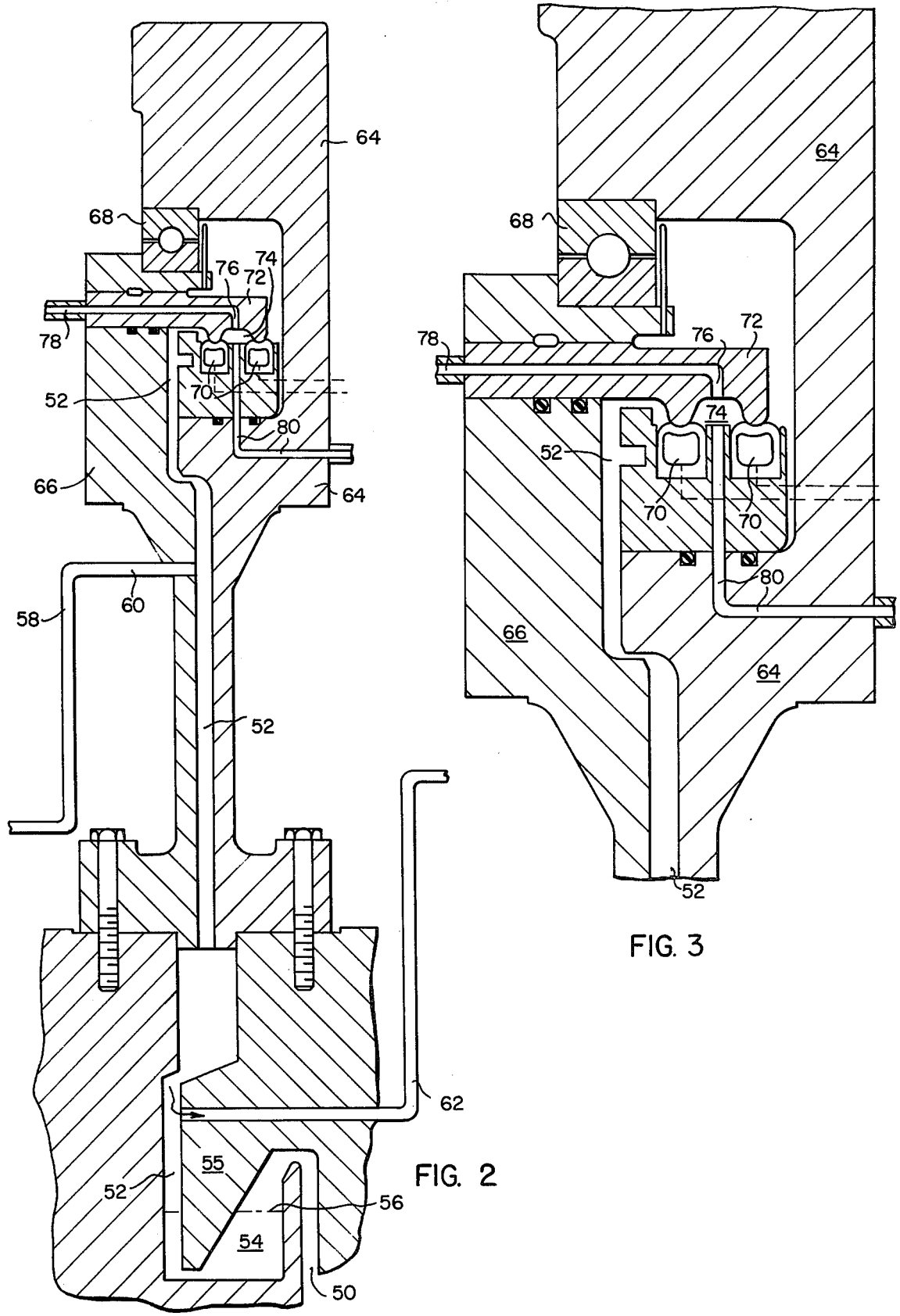
FIG. 2 is a cross-sectional view in elevation of a riser assembly embodying the invention.
FIG. 3 is a detailed cross-sectional view of the bearing and outer seal arrangement of the riser assembly.

FIG. 2 represents a typical riser assembly which is similar to the riser assemblies 34, 38, and 42. The annuli 36, 40 and 44 are represented by a typical annulus which is divided into two portions 50 and 52. Dividing the lower annulus 50 from the upper annulus 52, is a dip seal 54 with a cylindrical barrier 55. The dip seal 54 may be chosen from those well known in the art such as a liquid sodium dip seal. The cover gas 48 fills the lower annulus 50 up to the dip seal level 56. The liquid sodium in dip seal 54 will prevent the contaminated cover gas 48 from migrating from the lower annulus 50 into the upper annulus 52. However, increased cover gas pressure may force cover gas 48 to bubble under cylindrical barrier 55 in the dip seal 54 which may result in a small amount of cover gas 48 being released into the upper annulus 52. To prevent further contamination of the riser assembly and to prevent the escape of this portion of cover gas 48, a purge gas transfer system is provided to sweep away these contaminated particles.

Again referring to FIG. 2, in order to purge the upper annulus 52 a gas inlet conduit 58 is provided to conduct a non-contaminated purge gas 60 such as clean argon into the upper annulus 52 as shown. The purge gas 60 is not only forced down the upper annulus 52 but it is also forced through the upper annulus 52 in a circumferential direction. Thus the purge gas 60 sweeps the upper annulus 52 thereby removing the contaminated cover gas 48. The purge gas 60 is then conducted out of the upper annulus 52 through an outlet conduit 62 to the next riser assembly such as intermediate riser assembly 38 where the purge gas 60 performs the same function. It should be noted that the resistance to flow offered by dip seal 54 serves to divert the flow of purge gas 60 into outlet conduit 62. However, under appropriate pressure conditions the ends of the upper annulus 52 need not be sealed. It is therefore apparent that since the annuli of the rotatable plugs are used as the connection between the rotatable plugs for the flow of the gas, this system provides a means of conducting a purge gas between members capable of relative motion without the use of mechanical connections while purging the annulus there-between. Not only does the system provide a means for purging the annulus but it also provides a means for buffering seals.

In FIG. 3 the top of a typical riser assembly is shown in detail. FIG. 3 illustrates a means for buffering the seals in the upper annulus 52. Inner riser 64 is supported from the outer riser 66 by bearing 68 to permit relative rotation between the risers as the plugs rotate. To seal the upper annulus 52 from the atmosphere as a further protection from both oxygen in-leakage and cover gas out-leakage, two inflatable elastomer seals 70 are arranged in series on the inner riser 64. A forked member 72 is disposed on the outer riser 66 in a manner so as to contact inflatable seals 70 thereby sealing the upper annulus 52. In addition, a lubricant which may be chosen form those well known in the art may be applied to the inflatable seals 70 to insure proper sealing between inflatable seals 70 and forked member 72. During reactor operation the inflatable seals 70 are inflated so that the inflatable seals 70 conform to the surface of forked member 72 and to the seating area of the seals thereby increasing contact between the inflatable seals 70 and forked member 72. However, during refueling of the reactor it is necessary to rotate the rotatable plugs. Rotation of the rotatable plugs requires rotation of the inner riser 64 relative to the outer riser 66 which in turn means that there must be relative rotational motion between forked member 72 and inflatable seals 70. To aid this rotational motion, the inflatable seals 70 are slightly deflated just prior to the time plug rotation takes place. It has been proven to be prudent to fill the buffer space 74 between inflatable seals 70 and forked member 72 with a buffer gas 76 such as clean argon. When the buffer space 74 is pressurized with buffer gas 76 leakage between buffer space 74 and upper annulus 52 will be predominately toward upper annulus 52 thereby adding an additional safeguard against radioactive cover gas leakage. Further, buffer gas 76 is conducted to buffer space 74 by means of a conduit 78 and from buffer space 74 by conduit 80 thereby purging buffer space 74 and again reducing the possibility of radioactive contaminants escaping. The buffer gas 76, upon leaving inner riser 64 may be conducted to another riser assembly. The buffer gas piping system, therefore, provides a means of conducting a gas from one component of a nuclear reactor to another component wherein the components are capable of relative motion without the use of mechanical connections such as flexible piping or swivel jointed piping. The above described purge gas systems and buffer gas systems may be used separately or together. Although, the above described the two systems as used on a single riser assembly, the following will discuss their application to a series of rotatable plugs and riser assemblies.

Figure 4:
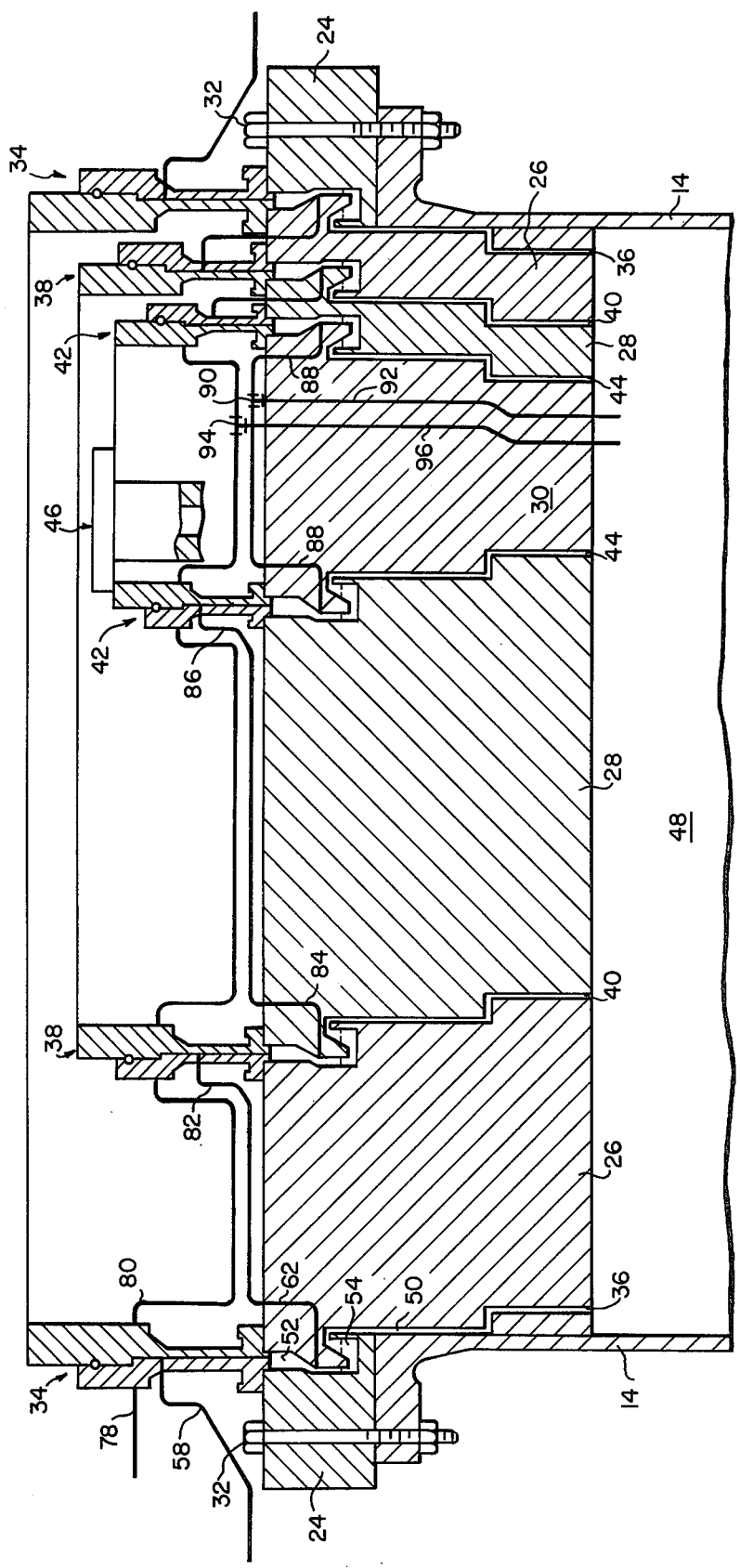
FIG. 4 is a cross-sectional view in elevation of a typical reactor vessel head embodying rotatable plugs with the invention.

FIG. 4 is a cross-sectional elevation of the closure head showing the purge gas and buffer gas piping systems and illustrating the interconnection of the systems with the rotatable plugs. The outlet conduit 62 conducts the purge gas from the large riser assembly 34 to the intermediate riser assembly 38 at inlet 82. In a similar manner, the purge gas is conducted from the outlet 84 of the intermediate riser assembly 38 to inlet 86 of the small riser assembly 42. From outlet 88 of small riser assembly 42, the purge gas is conducted through a valve system 90 into an exhaust conduit 92 which exhausts the purge gas into the cover gas 48. It should be noted that although not necessary the system is symmetrical with respect to the closure head. Thus, valve system 90 which may be chosen from those valves well known in the art serves to collect the purge gas from all the outlet locations on the small rotatable plug 30 and direct the flow into exhaust conduit 92. Exhaust conduit 92 is chosen such that the speed of the purge gas exiting from exhaust conduit 92 prevents diffusion of radioactive particles up exhaust conduit 92. In addition to serving as a collecting means, valve system 90 may be activated in the event of a pressure failure in the piping system thus preventing reverse flow in the system.

Again referring to FIG. 4, the buffer gas system interconnects with the rotatable plugs in a manner similar to the purge gas system and is collected by valve system 94 and exhausted through exhaust conduit 96. Of course, the systems may, at some locations, utilize the same piping or valves such as valve systems 90 and 94 may be replaced with a single valve system. Likewise, exhaust conduits 92 and 96 may be replaced with a single exhaust conduit.

The system described herein utilizes the annular passageways between movable components as the interconnections between the movable components for the transfer of a fluid therebetween. This system has particular advantage when used on a series of movable components. This particular advantage is that there need be no cumbersome flexible piping or swivel joints used to conduct the fluid to the inner components because the means of conduction is the annuli of the components.

Figure 5:
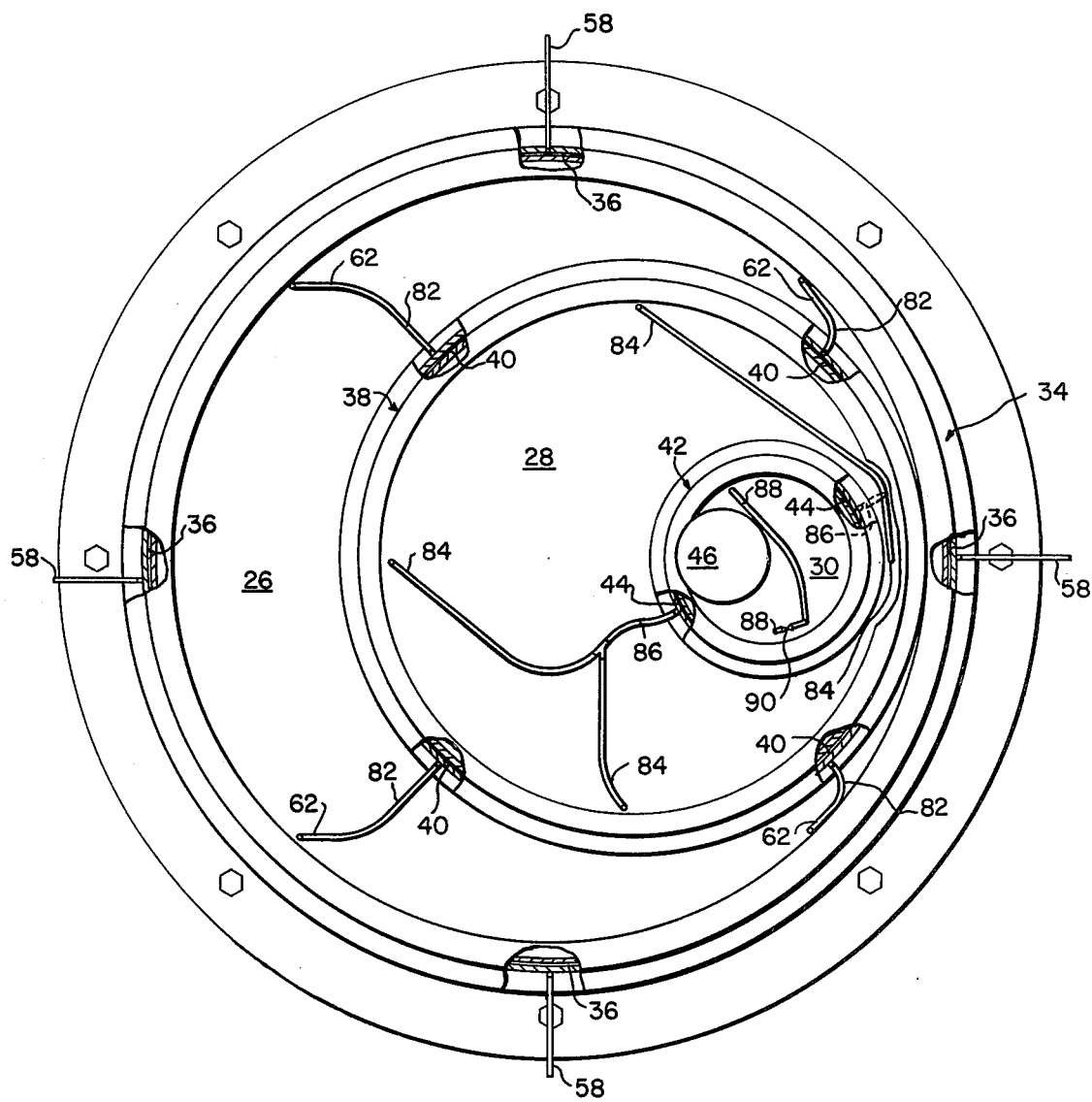
FIG. 5 is a plan view of a reactor vessel head illustrated in FIG. 4.

The purge gas piping system of FIG. 4 is further illustrated in FIG. 5 wherein there is shown four inlet conduits 58 which conduct the purge gas 60 into the upper annulus 52 of the large riser assembly 34. The four inlet conduits 58 are approximately evenly spaced about the circumference of the large riser assembly 34. The purge gas 60 not only sweeps down the upper annulus 52, but also sweeps circumferentially to the four outlet conduits 62 which are also evenly spaced around large riser assembly 34. The four outlet conduits 62 conduct the purge gas 60 to the four evenly spaced inlets 82 of the intermediate riser assembly 38. In a manner similar to the large riser assembly 34, the purge gas 60 sweeps the upper annulus of the intermediate riser assembly 38 and exits through outlets 84. Purge gas 60 then combines to enter two evenly spaced inlets 64 of the small riser assembly 42. Upon exiting the small riser assembly 42 through outlets 88, FIGS. 4 and 5, purge gas 60 is exhausted into cover gas 48 through exhaust conduit 92. The system, herein described, eliminates piping connections across the annuli of the risers and rotatable plugs by utilizing the annuli as a passageway. Therefore, this system permits easy rotation of the rotatable plugs without the use of cumbersome flexible tubing or similar apparatus. Of course, it is evident that the buffer gas system has the same advantages.

While there is described what is now considered to be the preferred embodiment of the invention, it is, of course, understood that various other modifications and variations will occur to those skilled in the art. The claims, therefore, are intended to include all such modifications and variations which fall within the true spirit and scope of the present invention. For example, the systems herein described may be used on a component either alone or in conjunction with a similar system on the lower annulus of the component. In addition, the invention may be utilized on other components of nuclear reactors such as fuel handling machines. Moreover, the present invention may be used whenever it is advisable to conduct a fluid across a boundary of members capable of relative movement. It, therefore, is to be understood that within the scope of the appended claims, the invention may be practiced other than as specifically described herein.

I claim:

1. A nuclear reactor including a reactor vessel, fuel assemblies positioned therein, an inlet and an outlet for circulating a coolant in a heat transfer relationship with said fuel assemblies, and a closure head disposed on said reactor vessel in a fluid tight relationship, said closure head comprising:
    a first riser assembly and a first rotatable plug disposed on said reactor vessel together defining a first annulus;
    a first liquid dip seal disposed on a lower portion of said first annulus for preventing the release of contaminated particles from said reactor vessel through said first annulus;
    a first inflatable seal disposed in an upper portion of said first annulus for isolating said first annulus from the atmosphere outside said reactor vessel;
    a first conduit connected to said first annulus near said first inflatable seal and between said first inflatable seal and said first liquid dip seal for introducing a purge gas into said first annulus;
    a second riser assembly and a second rotatable plug disposed in said first riser assembly and said first rotatable plug combination and defining a second annulus;
    a second liquid dip seal disposed in a lower portion of said second annulus for preventing the release of contaminated particles from said reactor vessel through said second annulus;
    a second inflatable seal disposed in an upper portion of said second annulus for isolating said second annulus from the atmosphere outside said reactor vessel;
    a second conduit connected at one end to said first annulus near said first liquid dip seal and between said first liquid dip seal and said first inflatable seal and connected at the other end to said second annulus near said second inflatable seal and between said second inflatable seal and said second liquid dip seal for conducting said purge gas from said first annulus and into said second annulus; and
    a third conduit connected at one end to said second annulus near said second liquid dip seal and between said second liquid dip seal and said second inflatable seal with its other end disposed in said reactor vessel for conducting said purge gas from said second annulus and into said reactor vessel, said purge gas removing contaminants that may be present in said first and second annuli while said first and second annuli serve as the interconnection between said conduits.

2. The nuclear reactor according to claim 1 wherein said closure head further comprises:
    a third inflatable seal disposed in said first annulus in series with said first inflatable seal and defining a first buffer space therebetween;
    a fourth conduit connected to said first annulus between said first and third inflatable seals for introducing a buffer gas to said first buffer space;
    a fourth inflatable seal disposed in said second annulus in series with said second inflatable seal and defining a second buffer space therebetween;
    a fifth conduit connected between said first buffer space and said second buffer space for conducting said buffer gas from said first buffer space to said second buffer space; and
    a sixth conduit connected between said second buffer space and said reactor vessel for conducting said buffer gas into said reactor vessel, said buffer gas establishing a gas isolating buffer for the prevention of leakage of contaminants from said reactor vessel while said buffer spaces serve as the interconnection between said fourth conduit and said sixth conduit.

3. The nuclear reactor according to claim 2 wherein said closure head further comprises:
    a first valve connected to said third conduit and a second valve connected to said sixth conduit for selectively closing said conduits thereby preventing reverse flow in said conduits.

* * * * *